(12) United States Patent
Xie et al.

(10) Patent No.: US 10,202,703 B2
(45) Date of Patent: Feb. 12, 2019

(54) METHOD FOR TREATING WASTE LIQUID FROM PROCESS OF ETCHING INDIUM TIN OXIDE

(71) Applicants: BOE Technology Group Co., Ltd., Beijing (CN); Hefei Xinsheng Optoelectronics Technology Co., Ltd., Hefei (CN)

(72) Inventors: Yongxian Xie, Beijing (CN); Chuanfeng Deng, Beijing (CN); Youlu Li, Beijing (CN); Zhiyang He, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/685,736

(22) Filed: Aug. 24, 2017

(65) Prior Publication Data
US 2018/0187327 A1 Jul. 5, 2018

(30) Foreign Application Priority Data
Jan. 5, 2017 (CN) .......................... 2017 1 0009118

(51) Int. Cl.
| | |
|---|---|
| C02F 1/46 | (2006.01) |
| C25F 3/08 | (2006.01) |
| C02F 1/461 | (2006.01) |
| C02F 9/00 | (2006.01) |
| C02F 1/04 | (2006.01) |
| C02F 1/467 | (2006.01) |
| C02F 1/52 | (2006.01) |
| C02F 1/66 | (2006.01) |
| C02F 103/34 | (2006.01) |

(52) U.S. Cl.
CPC ................ C25F 3/08 (2013.01); C02F 1/461 (2013.01); C02F 9/00 (2013.01); C02F 1/048 (2013.01); C02F 1/4678 (2013.01); C02F 1/5236 (2013.01); C02F 1/66 (2013.01); C02F 2103/346 (2013.01)

(58) Field of Classification Search
CPC .... C25F 3/08; C02F 9/00; C02F 1/461; C02F 1/048; C02F 1/66; C02F 2103/346; C02F 1/5236; C02F 1/4678
See application file for complete search history.

(56) References Cited

U.S. PATENT DOCUMENTS 6,533,966 B1 * 3/2003 Nonninger ............. C01G 19/00
252/520.1
2008/0190779 A1    8/2008 Nakamura et al.

FOREIGN PATENT DOCUMENTS

| CN | 101104883 A | 1/2008 |
| CN | 101115854 A | 1/2008 |
| CN | 101403051 A | 4/2009 |
| CN | 101439849 A | 5/2009 |
| CN | 101445262 A | 6/2009 |
| CN | 101892495 A | 11/2010 |
| EP | 1 845 169 A1 | 10/2007 |
| JP | 5298385 B2 | 9/2013 |

OTHER PUBLICATIONS

First Office Action, including Search Report, for Chinese Patent Application No. 201710009118.4, dated Feb. 24, 2018, 18 pages.
Chinese Rare Metals, the first edition, published on May 30, 2014 China Nonferrous Metals Association, Metallurgical Industry Press, pp. 44-46, 5 pages. (English translation of Abstract only).
Shunde Zheng, Study on Recovering Indium and Tin from ITO Waste Targets, Chinese Excellent Master Dissertation Full-text Database published on May 15, 2006, 70 pages. (English translation of Abstract only).
Shukai Wang, Recycling Indium and Tin by Treating ITO Waste with Sulphuric acid and Hydrochloric acid Leaching-sulfide Precipitation, Chinese Engineering Science, vol. 11, period 9, published on Dec. 31, 2009 pp. 34-37, 5 pages. (English translation of Abstract only).

* cited by examiner

*Primary Examiner* — Arun S Phasge
(74) *Attorney, Agent, or Firm* — Westman, Champlin & Koehler, P.A.

(57) ABSTRACT

This disclosure provides a method for treating an etching waste liquid from an etching process of indium tin oxide comprising hydrochloric acid, acetic acid, tin ions, indium ions and water, comprising the steps of: distilling the etching waste liquid to obtain a distillate comprising hydrochloric acid and acetic acid and a post-distillation liquid comprising tin ions and indium ions; generating a precipitate by reacting tin ions in the post-distillation liquid with sulfide ions to remove tin ions from the solution so as to obtain a post-precipitation solution containing indium ions; and electrolyzing the post-precipitation solution to obtain crude indium.

13 Claims, No Drawings

METHOD FOR TREATING WASTE LIQUID FROM PROCESS OF ETCHING INDIUM TIN OXIDE

CROSS REFERENCE TO RELATED APPLICATION

The application claims the priority of the Chinese Application No. 201710009118.4 filed on Jan. 5, 2017, whose total contents are incorporated by reference.

FIELD OF THE INVENTION

This disclosure relates to a comprehensive utilization method for treating an etching waste liquid, and particularly to a method for treating an etching waste liquid from an etching process of an indium tin oxide semiconductor transparent conductive film (ITO).

BACKGROUND OF THE INVENTION

Indium tin oxide semiconductor transparent conductive films (ITOs) are mainly used in, for example, thin-film field-effect transistor liquid crystal displays (TFT-LCDs), light-emitting diodes (LEDs), organic light-emitting diode (OLEDs), or the like. An etching liquid is required to be used for etching an ITO by a mask wet process to obtain a desired pattern.

An ITO etching liquid comprises an aqueous solution of hydrochloric acid and acetic acid, and a large amount of etching waste liquid, which exhibits to be acidic and contains a significant amount of hydrochloric acid and acetic acid, will be generated in the process of etching.

At present, a base, such as calcium hydroxide, calcium carbonate, or the like, is mainly used to perform neutralization treatment on an ITO etching waste liquid. However, this method not only wastes acid resources in the waste liquid, but also generates a large amount of waste water, which further results in environmental loads. At the meanwhile, indium, which is used as a raw material in the manufacture of an ITO target material, cannot be recovered. The rare metal indium is not only expensive, but also has a small storage amount. According to statistics, the global reserves of indium are merely 50 thousand tons, and those which can be exploited account for only 50% of the global reserves, and the consumption amount per year is 1700 tons or more. Therefore, the recovery and reutilization of indium is significantly meaningful to the protection of resources.

SUMMARY OF THE INVENTION

Therefore, it is required to provide a method for treating an etching waste liquid from an etching process of indium tin oxide. This method can recover the valuable substances, such as hydrochloric acid, acetic acid, and metal indium in waste liquid.

An object of this disclosure is to provide a method for treating an etching waste liquid from an etching process of indium tin oxide. This method has simple processes, and can recover the valuable substances, such as hydrochloric acid, acetic acid, and metal indium in waste liquid, so as to reduce the production cost and to protect the environment.

Therefore, in one aspect of this disclosure, there is provided a method for treating an etching waste liquid from an etching process of indium tin oxide comprising hydrochloric acid, acetic acid, tin ions, indium ions and water, comprising the steps of: distilling the etching waste liquid to obtain a distillate comprising hydrochloric acid and acetic acid and a post-distillation liquid comprising tin ions and indium ions; generating a precipitate by reacting tin ions in the post-distillation liquid with sulfide ions to remove tin ions from the solution so as to obtain a post-precipitation solution containing indium ions; and electrolyzing the post-precipitation solution to obtain crude indium.

According to one embodiment of this disclosure, the method further comprises the step of performing electrolytic refining on the crude indium to obtain indium with a purity of 99 wt % or more.

According to another embodiment of this disclosure, the distillation is performed under 0.9-1 atmospheric pressure and at 90-100° C.

According to another embodiment of this disclosure, the etching waste liquid comprises, in terms of weight, 5 to 30% of hydrochloric acid, 2 to 10% of acetic acid, 60 to 92% of water, 0.005 to 1% of tin ions, and 0.005 to 2.5% of indium ions; the distillate comprises, in terms of weight, 30 to 40% of hydrochloric acid, 8 to 12% of acetic acid, and 38 to 62% of water; and the post-distillation liquid comprises, in terms of weight, 0.01 to 2% of tin ions and 0.01 to 5% of indium ions.

According to another embodiment of this disclosure, the etching waste liquid comprises, in terms of weight, 17 to 22% of hydrochloric acid, 4 to 6% of acetic acid, 73 to 79% of water, 0.005 to 1% of tin ions, and 0.005 to 2.5% of indium ions; the distillate comprises, in terms of weight, 30 to 40% of hydrochloric acid, 8 to 12% of acetic acid, and 38 to 62% of water; and the post-distillation liquid comprises, in terms of weight, 0.01 to 2% of tin ions and 0.01 to 5% of indium ions.

According to another embodiment of this disclosure, the volume ratio of the distillate to the post-distillation liquid is 0.2 to 5.

According to another embodiment of this disclosure, the precipitation is performed at a pH of 0 to 2; and when the pH of the post-distillation liquid is less than 0, distillation is continued, and when the pH of the post-distillation liquid is greater than 2, the pH of the post-distillation liquid is adjusted to less than or equal to 2 by using hydrochloric acid, acetic acid, sulfuric acid, and/or an etching waste liquid.

According to another embodiment of this disclosure, a hydrogen sulfide gas is introduced to perform reaction of tin ions and sulfide ions in the post-distillation liquid for 0.5 minutes to 60 minutes.

According to another embodiment of this disclosure, the ratio of the molar amount of hydrogen sulfide introduced to the molar amount of tin ions is 1.1 to 10.

According to another embodiment of this disclosure, the electrolysis is performed by using a lead-silver electrode as an anode and a pure-indium electrode as a cathode, wherein the current density of the electrolysis is 60 to 80 A/m$^2$ and the cell voltage is controlled at 0.15 to 0.3V, to obtain crude indium with a purity of 90 to 98 wt %.

According to another embodiment of this disclosure, in the electrolytic refining, the crude indium is used as an anode, pure indium is used as a cathode, the electrolytic solution is an aqueous indium sulfate solution with a concentration of 40 to 100 g/L, the pH of the electrolytic solution is 1.5 to 2.5, the cell voltage is controlled at 0.15 to 0.3V, the current density is 60 to 80 A/m$^2$, and the electrolysis temperature is controlled at 20 to 30° C.

According to another embodiment of this disclosure, sodium chloride is added to the electrolytic solution.

According to another embodiment of this disclosure, the distillate comprising hydrochloric acid and acetic acid is used for preparing an etching liquid for indium tin oxide.

DETAILED DESCRIPTION OF THE INVENTION

The technical solutions in the examples of this disclosure will be described clearly and fully below in conjunction with specific embodiments of this disclosure. Obviously, the embodiments and/or examples described are merely a part of the embodiments and/or examples of this disclosure, rather than all of the embodiments and/or examples. Based on the embodiments and/or examples of this disclosure, all other embodiments and/or examples obtained by those of ordinary skill in the art without performing inventive work belong to the scope protected by this disclosure.

In the description below, the ratios or percentages stated are in terms of weight, and the pressure refers to the gauge pressure, unless specifically demonstrated. ITO represents an indium tin oxide semiconductor transparent conductive film.

In a method for treating an etching waste liquid from an etching process of indium tin oxide comprising hydrochloric acid, acetic acid, tin ions, indium ions and water, comprising the steps of: distilling the etching waste liquid to obtain a distillate comprising hydrochloric acid and acetic acid and a post-distillation liquid comprising tin ions and indium ions; generating a precipitate by reacting tin ions in the post-distillation liquid with sulfide ions to remove tin ions from the solution so as to obtain a post-precipitation solution containing indium ions; and electrolyzing the post-precipitation solution to obtain crude indium. By the method described above, hydrochloric acid and acetic acid in the etching waste liquid are recovered to reduce the amount of bases used in neutralization, and recovered hydrochloric acid and acetic acid may be used for formulating a new etching liquid; and tin ions are removed from the solution and the high-value metal indium is obtained by electrolysis, so that hydrochloric acid, acetic acid, and indium are reutilized.

In an exemplary embodiment of this disclosure, the method may further comprise the step of performing electrolytic refining on the crude indium to obtain indium with a purity of 99 wt % or more so that a high-purity indium may be obtained.

In another exemplary embodiment of this disclosure, the distillation may be performed under 0.9-1 atmospheric pressure and at 90-100° C. By means of the characteristic that hydrochloric acid and acetic acid are more volatile than water, they may be separated rapidly by a method of normal- and reduced-pressure distillation. Since hydrochloric acid and acetic acid may corrode metal materials such as steel, iron, etc., they may be subjected to normal- and reduced-pressure distillation in a polytetrafluoroethylene-lined apparatus.

In another exemplary embodiment of this disclosure, the etching waste liquid comprises, in terms of weight, 5 to 30% of hydrochloric acid, 2 to 10% of acetic acid, 60 to 92% of water, 0.005 to 1% of tin ions, and 0.005 to 2.5% of indium ions; the distillate comprises, in terms of weight, 30 to 40% of hydrochloric acid, 8 to 12% of acetic acid, and 38 to 62% of water; and the post-distillation liquid comprises, in terms of weight, 0.01 to 2% of tin ions and 0.01 to 5% of indium ions.

In still another exemplary embodiment of this disclosure, the etching waste liquid comprises, in terms of weight, 17 to 22% of hydrochloric acid, 4 to 6% of acetic acid, 73 to 79% of water, 0.005 to 1% of tin ions, and 0.005 to 2.5% of indium ions; the distillate comprises, in terms of weight, 30 to 40% of hydrochloric acid, 8 to 12% of acetic acid, and 38 to 62% of water; and the post-distillation liquid comprises, in terms of weight, 0.01 to 2% of tin ions and 0.01 to 5% of indium ions.

In another exemplary embodiment of this disclosure, the volume ratio of the distillate to the post-distillation liquid is 0.2 to 5.

By means of distillation, not only hydrochloric acid and acetic acid are recovered, but also tin ions and indium ions are concentrated, which is favorable to the following precipitation.

In another exemplary embodiment of this disclosure, the precipitation may be performed at a pH of 0 to 2; wherein the pH may be, for example, 0 to 0.9, such as 0 to 0.8, such as 0 to 0.5; and when the pH of the post-distillation liquid is less than 0, distillation may be continued, and when the pH of the post-distillation liquid is greater than 2, the pH of the post-distillation liquid may be adjusted to less than or equal to 2 by using hydrochloric acid, acetic acid, sulfuric acid, and/or an etching waste liquid.

In another exemplary embodiment of this disclosure, a hydrogen sulfide gas is introduced to perform reaction of tin ions and sulfide ions in the post-distillation liquid for 0.5 minutes to 60 minutes, for example 1 to 50 minutes, such as 10 to 40 minutes. Thus, other metal ions may not be introduced. As required, sodium sulfide, potassium sulfate, and the like may be used in precipitation, which is advantageous to ensure the conductive property of the electrolytic solution, reduce the cell voltage, and reduce anode passivation.

In another exemplary embodiment of this disclosure, the ratio of the molar amount of hydrogen sulfide introduced to the molar amount of tin ions is 1.1 to 10, for example 2 to 8. For example, the molar amount of hydrogen sulfide introduced is about 5 times that of tin ions, and the content of sulfide ions is 1 wt % or less after removing tin by precipitation.

In the step of precipitation, by means of the different bonding abilities of indium and tin with $S^{2-}$, $H_2S$ gas is introduced to obtain the tin sulfate precipitate, and a filtrate containing indium is obtained after filtration.

By performing precipitation under the conditions described above, the concentration of tin ions may be reduced to 10 mg/L or less by weight, while the precipitation of indium ions has not occurred yet, so that a better separation effect of tin ions and indium ions is achieved. Tin sulfate obtained by filtration may be optionally further treated, and is used for preparing tin sulfate target materials, manufacturing light absorbing layers of solar cells, preparing metal tin or tin oxide, or preparing ITO.

In another exemplary embodiment of this disclosure, the electrolysis is performed by using a lead-silver electrode as an anode and a pure-indium electrode as a cathode, wherein the current density of the electrolysis is 60 to 80 $A/m^2$ and the cell voltage is controlled at 0.15 to 0.3V, to obtain crude indium with a purity of 90 to 98 wt %.

In another exemplary embodiment of this disclosure, in the electrolytic refining, the crude indium is used as an anode, pure indium is used as a cathode, the electrolytic solution is an aqueous indium sulfate solution with a concentration of 40 to 100 g/L, the pH of the electrolytic solution is 1.5 to 2.5, the cell voltage is controlled at 0.15 to 0.3V, the current density is 60 to 80 $A/m^2$, and the electrolysis temperature is controlled at 20 to 30° C.

In another exemplary embodiment of this disclosure, sodium chloride is added to the electrolytic solution in electrolytic refining, so as to ensure the conductive property of the electrolytic solution, reduce the cell voltage, and reduce anode passivation.

In another exemplary embodiment of this disclosure, the distillate comprising hydrochloric acid and acetic acid is used for preparing an etching liquid for indium tin oxide. The distillate may also be used for preparing other etching liquids, or may be further separated into hydrochloric acid and acetic acid.

Particularly, an exemplary embodiment of this disclosure makes use of the property that hydrochloric acid and acetic acid are readily volatile. By normal-pressure or reduced-pressure distillation, a mixture of hydrochloric acid and acetic acid is recovered, tin in the post-distillation liquid is separated and precipitated and is then removed by filtration, and the solution containing indium ions is electrolyzed to obtain crude indium, which is electrolytically refined to obtain a high-purity indium. Specific steps are as follows.

(a): The components contained in a waste liquid and the specific contents thereof are analyzed.

(b): By means of the characteristic that hydrochloric acid and acetic acid are more volatile than water, they are separated by a method of normal- and reduced-pressure distillation. Since hydrochloric acid and acetic acid may corrode metal materials such as steel, iron, etc., they may be subjected to reduced-pressure distillation in a polytetrafluoroethylene-lined apparatus.

(c): Hydrochloric acid and acetic acid obtained by distillation in step b are formulated at a suitable ratio to be used as a new etching liquid for recirculation and reutilization.

(d): The solution after distillation contains indium ions and tin ions, and the pH thereof is adjusted to about 0 to 2. By means of the different bonding abilities of indium and tin with $S^{2-}$, $H_2S$ gas is introduced to obtain the tin sulfate precipitate, and a filtrate containing indium is obtained after filtration.

(e): The filtrate is electrolyzed by using a lead-silver anode as an anode and pure indium as a cathode, and $H_2O$ loses electrons at the anode to generate oxygen. Furthermore, a small amount of chlorine gas may be generated at the anode, the whole electrolysis cell may be sealed, the generated gas may be introduced to a basic solution to absorb chlorine gas therein, and indium ions gain electrons at the cathode to generate metal indium.

(f): Crude indium obtained in step e is further electrolytically refined and a high-purity indium with a purity of 99% or more may be obtained.

The recovered high-purity indium may be used for preparing low-melting alloys, bearing alloys, ITO, electric light sources, or the like.

In another exemplary embodiment of this disclosure, there are tetravalent tin ions and bivalent tin ions in ITO, and those which are etched and passing into the etching waste liquid are mainly bivalent tin ions.

In another exemplary embodiment of this disclosure, the distillation is performed in a distillation apparatus, wherein a distillation flask may be used in a laboratory and a distillation column may be used in the industry.

In another exemplary embodiment of this disclosure, the precipitation is performed in a precipitation apparatus, wherein a beaker may be used in a laboratory and a precipitation tank may be used in the industry.

In another exemplary embodiment of this disclosure, the filtration is performed in a filtration apparatus, wherein a vacuum suction filtration funnel may be used in a laboratory and a filter press may be used in the industry.

In another exemplary embodiment of this disclosure, the electrolysis is performed in an electrolysis cell, which is an acid type electrolysis cell, wherein the anode is a lead-silver alloy and the cathode is pure indium, and reinforced glass is used as the material of the main body of the electrolysis cell.

In another exemplary embodiment of this disclosure, the electrolytic refining is performed in an electrolytic refining apparatus, which is an acid type electrolysis cell, wherein the anode is crude indium obtained by electrolysis and the cathode is pure indium, and reinforced glass is used as the material of the main body of the electrolysis cell.

By a method in one exemplary embodiment of this disclosure, the valuable substances, such as hydrochloric acid, acetic acid, and indium, in waste liquid are recovered and reutilized. It is advantageous to reduce the production cost and protect the environment, and clean production in the ITO thin-film etching procedure in the manufacture of TFT-LCDs is realized.

EXAMPLES

In the examples below, the parts and ratios stated were in terms of weight, unless specifically demonstrated. The examples are used for the purpose of illustration, and should not be considered to limit the scope of this disclosure.

In the examples below, the apparatuses used are as follows:

Distillation apparatus: distillation flask
Precipitation apparatus: beaker
Filtration apparatus: vacuum suction filtration funnel
Electrolysis cell: acid type electrolysis cell
Electrolytic refining apparatus: acid type electrolysis cell
The analysis methods used are as follows:
Hydrochloric acid: the content of hydrochloric acid was measured by $AgNO_3$ titration method.
Acetic acid: the total content of hydrochloric acid and acetic acid was measured by acid-base titration method, and the content of acetic acid was obtained by subtracting the content of hydrochloric acid.
Water: the content of water was obtained by subtracting the total content of hydrochloric acid and acetic acid from the total amount of the etching waste liquid.
Sulfide ions: the molar amount of the desired $H_2S$ was calculated according to the content of tin ions and was in turn converted to the volume of $H_2S$.
Tin ions: ICP (inductively coupled plasma emission spectrometer) analysis was used.
Indium ions: ICP (inductively coupled plasma emission spectrometer) analysis was used.
Indium purity: EDTA titration method was used, wherein a material was firstly dissolved and the content of indium was then titrated with an EDTA standard solution.

Example 1

In a distillation apparatus, 1000 ml (1080 g) of an etching waste liquid from an etching process of indium tin oxide containing 313.2 g of hydrochloric acid, 86.4 g of acetic acid, 4.32 g of tin ions, and 1.62 g of indium ions was charged, and distilled at a pressure of 1 standard atmospheric pressure and at a temperature of 100° C. to obtain 825 ml of a distillate and 175 ml of a post-distillation liquid. The distillate comprised 4.32 g of tin ions and 1.62 g of indium ions; and the post-distillation liquid comprised 18.5 g of hydrochloric acid, 12.32 g of acetic acid, and 138.2 g of water, and the pH thereof was 2.02. Hydrochloric acid was added to until pH=0.1.

In a precipitation apparatus, 175 ml of the post-distillation liquid was charged. Hydrogen sulfide gas was introduced at a rate of 10 ml/S for 40 minutes to generate a precipitate. Filtration was performed with a vacuum suction filtration funnel, and the precipitate was washed with water to obtain 5.46 g of a tin sulfate precipitate. The filtrate contained 1.62 g of indium ions.

In an electrolysis cell, 170 ml of the filtrate was charged. Under conditions of a cell voltage of 0.3V, a current density of 55 A/m$^2$, and an electrolysis temperature of 28° C., electrolysis was performed to obtain 1.66 g of crude indium with a purity of 94.9%.

In an electrolytic refining apparatus, 1.66 g of the crude indium was used as an anode, pure indium was used as a cathode, the electrolytic solution was an aqueous indium sulfate solution with a concentration of 50 g/L, the pH of the electrolytic solution was 3, the cell voltage was controlled at 0.2V, the current density was 60 A/m$^2$, and the electrolysis temperature was controlled at 25° C., and 1.57 g of pure indium with a purity of 99.9% was obtained.

Example 2

In a distillation apparatus, 1000 ml (1080 g) of an etching waste liquid from an etching process of indium tin oxide containing 313.2 g of hydrochloric acid, 86.4 g of acetic acid, 4.32 g of tin ions, and 1.62 g of indium ions was charged, and distilled at a pressure of 1 standard atmospheric pressure and at a temperature of 100° C. to obtain 825 ml of a distillate and 175 ml of a post-distillation liquid. The distillate comprised 4.32 g of tin ions and 1.62 g of indium ions; and the post-distillation liquid comprised 18.5 g of hydrochloric acid, 12.32 g of acetic acid, and 138.2 g of water, and the pH thereof was 2.02. Hydrochloric acid was added to until pH=1.

In a precipitation apparatus, 175 ml of the post-distillation liquid was charged. Hydrogen sulfide gas was introduced at a rate of 10 ml/S for 40 minutes to generate a precipitate. Filtration was performed with a vacuum suction filtration funnel, and the precipitate was washed with water to obtain 3.84 g of a tin sulfate precipitate. Since only 60% tin was removed and the effect of tin removal was fair, which would result in a relatively low high purity of indium obtained subsequently.

Comparative Example 1

In a distillation apparatus, 1000 ml (1080 g) of an etching waste liquid from an etching process of indium tin oxide containing 313.2 g of hydrochloric acid, 86.4 g of acetic acid, 4.32 g of tin ions, and 1.62 g of indium ions was charged, and distilled at a pressure of 1 standard atmospheric pressure and at a temperature of 100° C. to obtain 825 ml of a distillate and 175 ml of a post-distillation liquid. The distillate comprised 4.32 g of tin ions and 1.62 g of indium ions; and the post-distillation liquid comprised 18.5 g of hydrochloric acid, 12.32 g of acetic acid, and 138.2 g of water, and the pH thereof was 2.02.

In a precipitation apparatus, 175 ml of the post-distillation liquid was charged. Hydrogen sulfide gas was introduced at a rate of 10 ml/S for 40 minutes to generate a precipitate. Filtration was performed with a vacuum suction filtration funnel, and the precipitate was washed with water to obtain 1.09 g of a tin sulfate precipitate. Since only 20% tin was removed and the effect of tin removal was not good, which would result in that more tin was contained in indium obtained subsequently and the purity was low.

It can be known from Examples 1 and 2 and Comparative Example 1 that tin ions in the solution may be well removed under the condition of relatively low pH, which is advantageous to subsequently obtain indium with a relatively high purity.

Obviously, various modifications and variations may be made to the examples of this disclosure by the person skilled in the art without deviating from the spirit and the scope of this disclosure. Thus, if these modifications and variations of this disclosure are within the scope of the claims of this disclosure and equivalent techniques thereof, this disclosure also intends to encompass these modifications and variations.

What is claimed is:

1. A method for treating an etching waste liquid from an etching process of indium tin oxide comprising hydrochloric acid, acetic acid, tin ions, indium ions and water, comprising the steps of:
    distilling the etching waste liquid to obtain a distillate comprising hydrochloric acid and acetic acid and a post-distillation liquid comprising tin ions and indium ions;
    generating a precipitate by reacting tin ions in the post-distillation liquid with sulfide ions to remove tin ions from the solution so as to obtain a post-precipitation solution containing indium ions; and
    electrolyzing the post-precipitation solution to obtain crude indium.

2. The method according to claim 1, further comprising the step of performing electrolytic refining on the crude indium to obtain indium with a purity of 99 wt % or more.

3. The method according to claim 2, wherein in the electrolytic refining, the crude indium is used as an anode, pure indium is used as a cathode, the electrolytic solution is an aqueous indium sulfate solution with a concentration of 40 to 100 g/L, the pH of the electrolytic solution is 1.5 to 2.5, the cell voltage is controlled at 0.15 to 0.3V, the current density is 60 to 80 A/m$^2$, and the electrolysis temperature is controlled at 20 to 30° C.

4. The method according to claim 3, wherein sodium chloride is added to the electrolytic solution.

5. The method according to claim 1, wherein the distillation is performed under 0.9-1 atmospheric pressure and at 90-100° C.

6. The method according to claim 1, wherein
    the etching waste liquid comprises, in terms of weight, 5 to 30% of hydrochloric acid, 2 to 10% of acetic acid, 60 to 92% of water, 0.005 to 1% of tin ions, and 0.005 to 2.5% of indium ions;
    the distillate comprises, in terms of weight, 30 to 40% of hydrochloric acid, 8 to 12% of acetic acid, and 38 to 62% of water; and
    the post-distillation liquid comprises, in terms of weight, 0.01 to 2% of tin ions and 0.01 to 5% of indium ions.

7. The method according to claim 1, wherein the etching waste liquid comprises, in terms of weight, 17 to 22% of hydrochloric acid, 4 to 6% of acetic acid, 73 to 79% of water, 0.005 to 1% of tin ions, and 0.005 to 2.5% of indium ions;
    the distillate comprises, in terms of weight, 30 to 40% of hydrochloric acid, 8 to 12% of acetic acid, and 38 to 62% of water; and
    the post-distillation liquid comprises, in terms of weight, 0.01 to 2% of tin ions and 0.01 to 5% of indium ions.

8. The method according to claim 1, wherein the volume ratio of the distillate to the post-distillation liquid is 0.2 to 5.

9. The method according to claim 1, wherein the precipitation is performed at a pH of 0 to 2; and when the pH of the post-distillation liquid is less than 0, distillation is continued, and when the pH of the post-distillation liquid is greater than 2, the pH of the post-distillation liquid is adjusted to less than or equal to 2 by using hydrochloric acid, acetic acid, sulfuric acid, and/or an etching waste liquid.

10. The method according to claim 1, wherein a hydrogen sulfide gas is introduced to perform reaction of tin ions and sulfide ions in the post-distillation liquid for 0.5 minutes to 60 minutes.

11. The method according to claim 10, wherein the ratio of the molar amount of hydrogen sulfide introduced to the molar amount of tin ions is 1.1 to 10.

12. The method according to claim 1, wherein the electrolysis is performed by using a lead-silver electrode as an anode and a pure-indium electrode as a cathode, wherein the current density of the electrolysis is 60 to 80 $A/m^2$ and the cell voltage is controlled at 0.15 to 0.3V, to obtain crude indium with a purity of 90 to 98 wt %.

13. The method according to claim 1, wherein the distillate comprising hydrochloric acid and acetic acid is used for preparing an etching liquid for indium tin oxide.

* * * * *